US006950399B1

(12) United States Patent
Bushmitch et al.

(10) Patent No.: US 6,950,399 B1
(45) Date of Patent: Sep. 27, 2005

(54) SYSTEM AND ASSOCIATED METHOD FOR SCHEDULING TRANSPORT OF VARIABLE BIT-RATE DATA OVER A NETWORK

(75) Inventors: Dennis Bushmitch, Somerset, NJ (US); Sarit Mukherjee, Mt. Laurel, NJ (US); Sathya Narayanan, Bensalem, PA (US); Muthukumar Ratty, Campbell, CA (US); Quin Shi, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 686 days.

(21) Appl. No.: 09/610,269

(22) Filed: Jul. 6, 2000

(51) Int. Cl.[7] .......................... H04J 3/16; H04B 7/005; H04B 7/212

(52) U.S. Cl. ...................... 370/236; 370/278; 370/348; 370/443

(58) Field of Search ................................. 370/229, 236, 370/238, 395.4, 313, 319–322, 329, 346–349, 370/447, 449, 461–462, 278, 443; 710/109, 710/113, 241

(56) References Cited

U.S. PATENT DOCUMENTS

| | | | | |
|---|---|---|---|---|
| 5,559,798 A | * | 9/1996 | Clarkson et al. | 370/468 |
| 5,649,110 A | * | 7/1997 | Ben-Nun et al. | 370/351 |
| 5,970,062 A | * | 10/1999 | Bauchot | 370/310.2 |
| 6,408,005 B1 | * | 6/2002 | Fan et al. | 370/412 |
| 6,490,251 B2 | * | 12/2002 | Yin et al. | 370/236.1 |
| 6,529,520 B1 | * | 3/2003 | Lee et al. | 370/442 |
| 6,594,251 B1 | * | 7/2003 | Raissinia et al. | 370/347 |
| 6,657,983 B1 | * | 12/2003 | Surazski et al. | 370/337 |

* cited by examiner

*Primary Examiner*—Hassan Kizou
*Assistant Examiner*—Gregory B Sefcheck
(74) *Attorney, Agent, or Firm*—RatnerPrestia

(57) ABSTRACT

A method is provided for transmitting data packets over a bi-directional contention and reservation based network. The network includes an operably linked system controller for receiving upstream channel packets and originating downstream channel packets. At least one operably linked remote terminal is included for receiving the downstream channel packets and originating the upstream channel packets. The system controller provides periodically allocated grants to the at least one remote terminal in the downstream channel for scheduling data packet transfers in the upstream channel. The periodically allocated grants have a fixed bandwidth size. The system controller also provides dynamically allocated grants to the at least one remote terminal in the downstream channel upon request of the at least one remote terminal for scheduling data packet transfers in the upstream channel. The dynamically allocated grants are of a requested bandwidth size. The bandwidth size of a data packet of a stream of packets to be transmitted from the at least one remote terminal through the upstream channel is determined and if it is greater than the size of the periodically allocated grant a dynamically allocated grant is requested. The dynamically allocated grant is requested to be of a bandwidth size equivalent to the bandwidth size by which the data packet exceeds the size of the periodically allocated grant. A first portion of the data packet is transmitted in response to the periodically allocated grant along with the dynamically allocated grant request. The remaining portion of the data packet is transmitted in response to a next available grant.

16 Claims, 9 Drawing Sheets

SYSTEM AND ASSOCIATED METHOD FOR SCHEDULING TRANSPORT OF VARIABLE BIT-RATE DATA OVER A NETWORK

BACKGROUND OF THE INVENTION

The invention relates to a network scheduling protocol for transporting data packets. More particularly, this invention relates to a network system and scheduling protocol for transporting variable bit-rate data over a contention and reservation based cable network.

Data over cable system interface specifications (DOCSIS), defines a Media Access Control (MAC) standard for transmitting packetized data over the Internet, through a two-way cable network. Details of the DOCSIS standard can be found in (DOCSIS v1.0) Radio Frequency Specification. In DOCSIS, the cable modem termination system (CMTS) at the cable headend and the cable modems (CMs) at the customer premises constitute a point to multi-point communication network. The CMTS and the corresponding CMs act as forwarding agents that carry packetized data over the Internet transparently. DOCSIS architecture provides a simple and efficient way to carry Internet Protocol (IP) data traffic over a bi-directional cable data network.

Emerging multimedia applications exercise ever increasing demand for service guarantees from cable data networks. These applications include voice over IP (VoIP) for IP telephony service and compressed video over IP for video on demand, video conferencing, and image editing, to name a few. In particular, video encoded according to the Moving Picture Experts Group (MPEG) standard, a widely accepted standard for digital video transmission and storage, has found wide applicability in satellite, cable, and wireless-based video distribution systems, as well as in computer imaging. However, due to the nature of the video bursts and variable bit-rate (VBR) of the MPEG video, reliable transport of MPEG video of exceptional quality over IP networks has become increasingly difficult.

Accordingly, there is a need for a novel quality of service (QoS) scheduling mechanism suitable for transporting variable bit-rate video over a (data over cable system interface specification) DOCSIS compliant cable for improving bandwidth utilization and latency distribution.

SUMMARY OF THE INVENTION

The present invention comprises a method of transmitting data packets over a bi-directional contention and reservation based network. The network includes an operably linked system controller for receiving upstream channel packets and originating downstream channel packets. At least one operably linked remote terminal is provided for receiving the downstream channel packets and originating the upstream channel packets. The network provides periodically allocated grants from the system controller to the at least one remote terminal in the downstream channel for scheduling data packet transfers in the upstream channel. The periodically allocated grants have a fixed bandwidth size. The network also provides dynamically allocated grants from the system controller to the at least one remote terminal in the downstream channel upon request of the at least one remote terminal for scheduling data packet transfers in the upstream channel. The dynamically allocated grants are of a requested bandwidth size.

The method comprises determining whether the bandwidth size of a data packet of a stream of packets to be transmitted from the at least one remote terminal through the upstream channel is greater than the size of the periodically allocated grant. If the packet bandwidth size is greater than the size of the periodically allocated grant, a dynamically allocated grant is requested. The requested dynamically allocated grant is of a bandwidth size equivalent to the bandwidth size by which the data packet exceeds the size of the periodically allocated grant. A first portion of the data packet is then transmitted in response to the periodically allocated grant along with the dynamically allocated grant request. The remaining portion of the data packet is then transmitted in response to a next available grant.

In another aspect of the present invention, a method is provided which comprises decomposing a stream of data packets to be transmitted from the at least one remote terminal through the upstream channel into constant bit-rate portions and variable bit-rate portions. The constant bit-rate portions having a bandwidth size substantially equal to the average bit-rate of the stream of packets. The bandwidth size of the decomposed stream is determined. If the bandwidth size of the decomposed stream is greater than the size of the periodically allocated grant, a dynamically allocated grant is requested. The requested dynamically allocated grant is substantially equal in bandwidth size to the variable bit-rate portion. The constant bit-rate portion is then transmitted in response to a periodically allocated grant. The variable bit-rate portion is transmitted in response to a next available grant.

The periodically allocated grant size is dynamically adjusted for improving channel allocation by determining the average bandwidth size of an unused portion of a periodically allocated grant, determining the average bandwidth size of requested dynamically allocated grants, and adjusting the bandwidth size of the periodically allocated grant based on the measured sizes in relation to at least two predetermined thresholds.

BRIEF DESCRIPTION OF THE SEVERAL VIEWS OF THE DRAWINGS

The foregoing summary as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
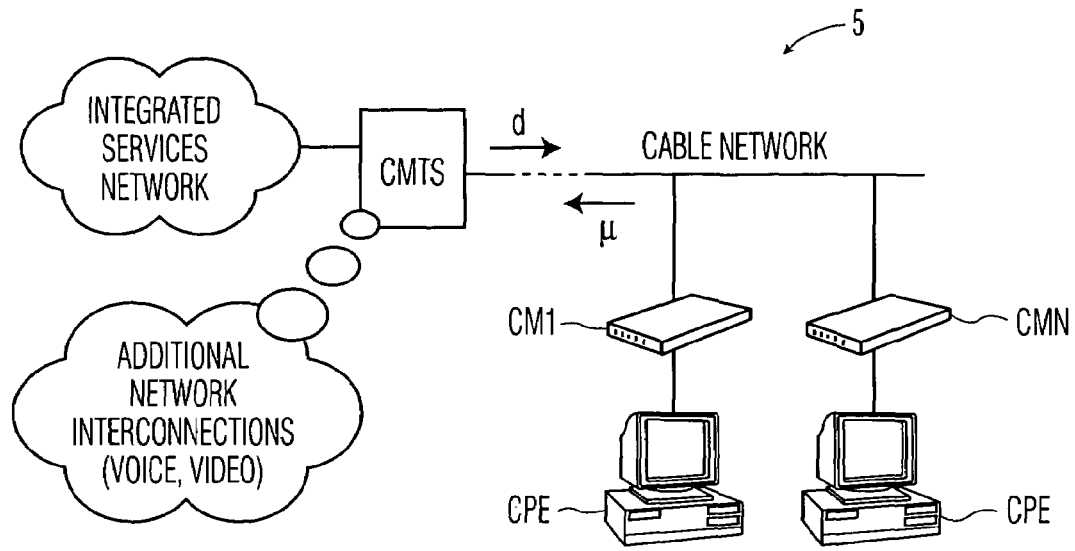
FIG. 1 is a plan view of a point to multi-point communication network.

Certain terminology is used herein for convenience only and is not to be taken as a limitation on the present invention. The term "bandwidth size" is defined as referring to a scheduling protocol grant size, the grant size being allocated in bytes, the number of bytes corresponding to a granted bandwidth. In the drawings, the same reference numerals are used for designating the same elements throughout the several figures.

A quality of service (QoS) media access control (MAC) scheduling mechanism is provided for a variable bit-rate (VBR) traffic environment to guarantee QoS parameters for video transmission on a contention and reservation based cable network. The proposed protocol is preferably implemented in the context of a DOCSIS compliant network and allocates a constant bit-rate (CBR) channel for a portion of the video data. The rate of this channel is generally kept lower than the average bit-rate of the video stream. The VBR portion of the transmission bandwidth for the remaining fraction of video data is allocated on demand. The protocol of the present invention yields improved performance for VBR video transport, in terms of lower latency and higher bandwidth utilization.

Referring now more specifically to FIG. 1, the network 5 operates in compliance with a set of interface specifications and protocols that dictate the data packet transmission and traffic in both the downstream (designated by the arrow d) and upstream (designated by the arrow u) directions between the cable modem termination system (CMTS) or "system controller" and at least one cable modem (CM) or "remote terminal" in a bi-directional cable network environment 5. The network topology of the cable distribution system resembles a tree and branch architecture, which is essentially a bus structure. As can be appreciated, the topology shown in FIG. 1 is simplified. For Internet access and connections to the outside network, both CMTS and CMs act as forwarding agents to transport the data transparently across the network 5, as defined by a set of interface specifications and protocols. Customer premises equipment (CPE), typically personal computers are shown operably linked to a corresponding CM.

The DOCSIS radio frequency (RF) specification, defines the physical interface and media access control (MAC) layer protocols for the network 5 of the present invention. In particular, the MAC layer defines bandwidth allocations, service flows, and supported QoS, for CMs to access the network 5 and CMTS to regulate data traffic.

In this MAC domain, the CMTS manages network bandwidth and traffic in both the upstream (u) and downstream (d) directions. The bandwidth allocation for a CM or CMs is provided by the CMTS in terms of a collection of frequencies and time-slot intervals, the so-called frequency division multiplexing, and time division multiplexing. These time-slot intervals are also called transmission opportunities. The downstream channel carries control and data frames from CMTS to the CM while the data from CM to CMTS are transmitted in the upstream channel. The CMTS controls the access to the upstream channel(s) through MAC management messages transmitted downstream. A set of MAC management messages are defined, for the purpose of establishing and maintaining the upstream channel between the CM and the CMTS of the network 5.

Figure 2:
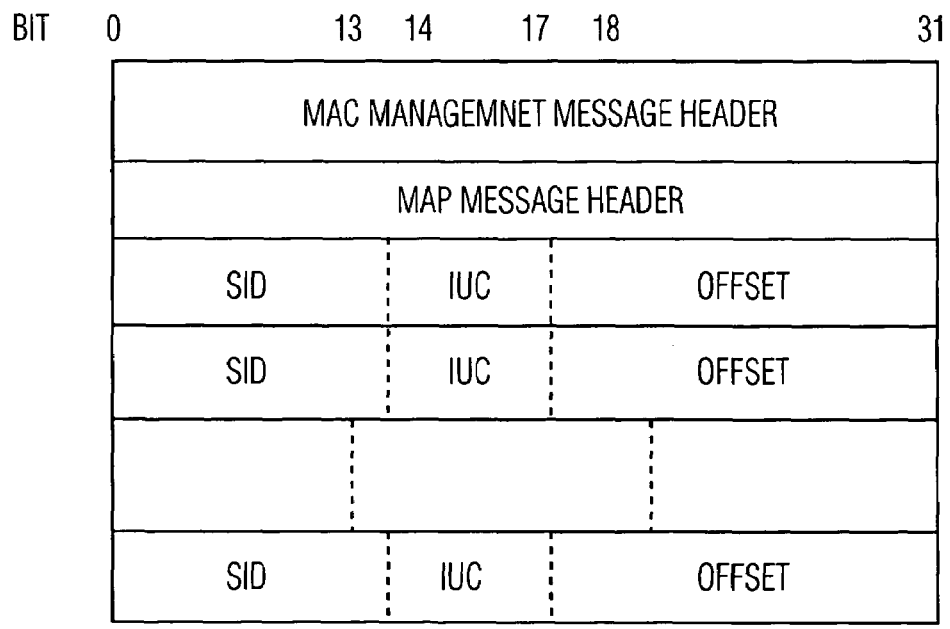
FIG. 2 is a bandwidth allocation structure of a downstream signal of the network of FIG. 1.

Specifically, the allocation of upstream intervals to the CMs is accomplished using MAC map messages sent by the CMTS periodically in the downstream direction; a bandwidth allocation data structure which is part of map message shown in FIG. 2. The bandwidth allocation structure is essentially the downstream signal of the CMTS for allocating upstream bandwidth. The map message contains a list of time intervals, the type of traffic each interval is allowed to carry, and an identifier that defines a particular cable modem (actually a particular service flow within a particular CM). A service flow is defined as a unidirectional flow of data from the CMTS to the CM or vice versa for a pre-defined QoS class. In FIG. 2, the service identifier (SID) identifies a particular upstream service flow within the MAC domain; the interval usage code (IUC) defines the type of traffic this interval is allowed to carry; and the offset defines the time interval.

The DOCSIS upstream bandwidth allocation scheme requires the existence of a universal clock between the CMTS and all CMs, since the start time for transmission specified in the map message is useful only if the CMTS and CM clocks are synchronized. This clock information is sent periodically by the CMTS through the timestamp synchronization message. The CM is able to time its transmission precisely so that data arrives at the CMTS at the beginning of the assigned interval. This may be achieved, for example, by (1) synchronizing to a global clock timing reference sent by the CMTS and (2) adjusting the delay offset incurred at the initial upstream transmission during a so-called ranging process.

In an earlier version of DOCSIS (version 1.0), only one QoS class was supported, that is, the "best effort," for data transmission in the upstream direction. In a more recent version, DOCSIS enhanced its QoS support, in both upstream and downstream traffic, by defining additional classes of service flows, with each identifying a particular QoS.

Figure 3:
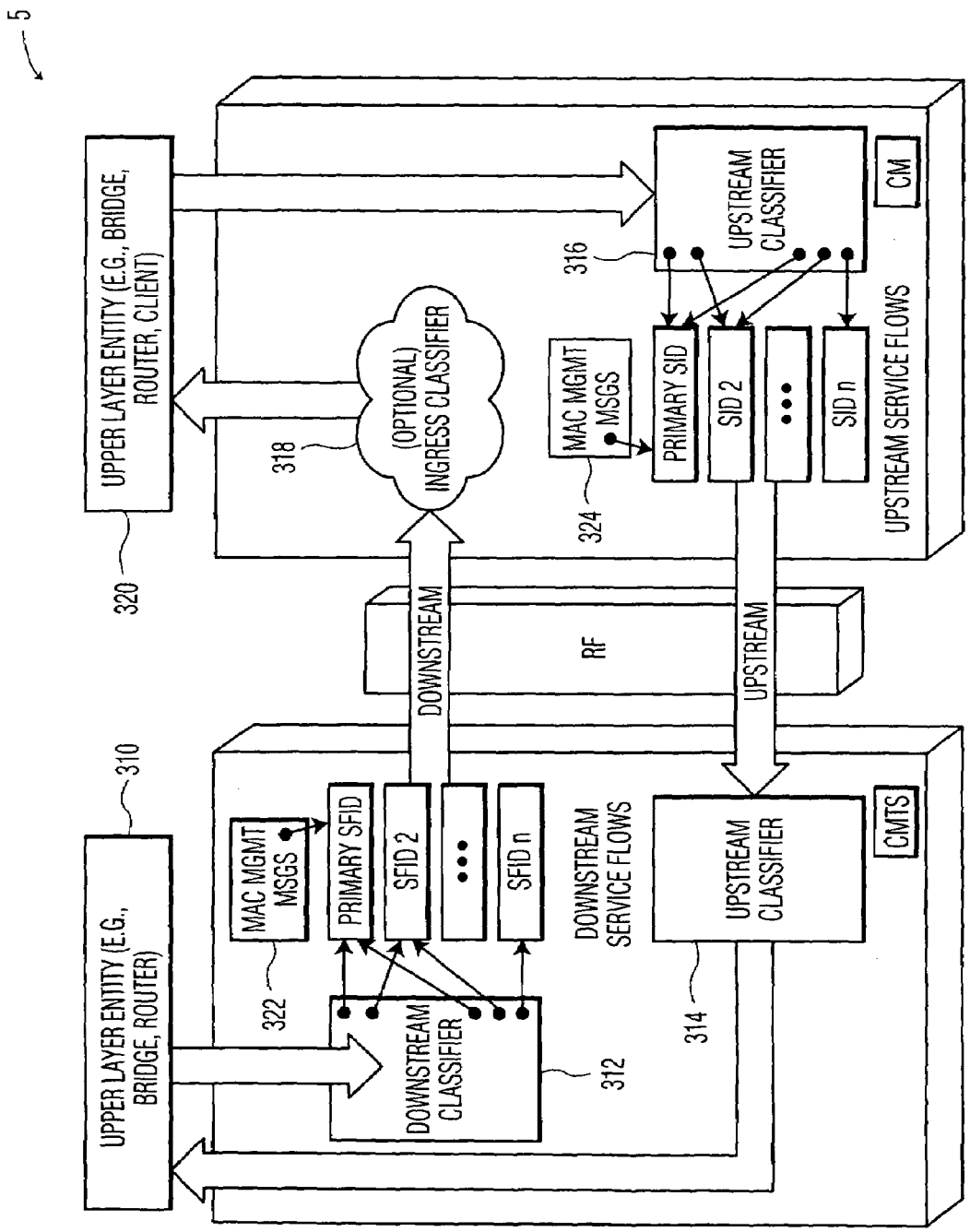
FIG. 3 is a block diagram of a preferred service flow architecture of the network of FIG. 1.

FIG. 3 shows the DOCSIS service classification and service flow architecture as utilized by the network 5 of the present invention. The data packets 310 entering the cable network from an upper layer entity such as a bridge or a router are classified into a service flow by a downstream classifier 312 based on a set of matching traffic criteria. These classified data packets are then associated with a particular QoS based on the QoS parameters of that particular service flow. The QoS may be guaranteed by shaping, policing, and/or prioritizing the data packets at both the CM and CMTS ends.

The QoS parameters include upstream service scheduling class parameters assigned by an upstream classifier 314 and some additional traffic parameters. The upstream scheduling classes may, for example, define specific bandwidth and latency guarantees that are adhered to by the CMTS upstream bandwidth scheduler. The CMTS allocates upstream bandwidth for a particular upstream service flow based on the parameters and service specifications of the corresponding service scheduling class. Messages formatted by the CMTS are transmitted to a CM which includes an optional ingress classifier 318, that may further classify the messages. Messages received by the CM are passed to an upper layer entity 320, such as a bridge, router or a client application.

Likewise, each CM of the network 5 includes an upstream classifier 316 for classifying packets received from the upper layer entity 320 into a service flow based on a set of matching traffic criteria. Each of the CMTS and the CM may attach MAC management messages in the packet headers as shown by the items 322 and 324 in FIG. 3.

DOCSIS employs two important scheduling classes, which are relevant to real-time upstream data transmission within the DOCSIS framework. These two service classes are the unsolicited grant service (UGS) and real-time polling service (rtPS).

The unsolicited grant service (UGS) class or "periodically allocated grants" are defined to support constant bit-rate (CBR) data transmission over the upstream channel. Periodic data transmission opportunities are allocated to this service flow. As the name implies, a service flow within the UGS scheduling class gets transmission opportunities without having to periodically request them. The purpose of UGS as defined in the DOCSIS specification is to reserve specific upstream transmission opportunity for specific real-time traffic flows.

Figure 4:
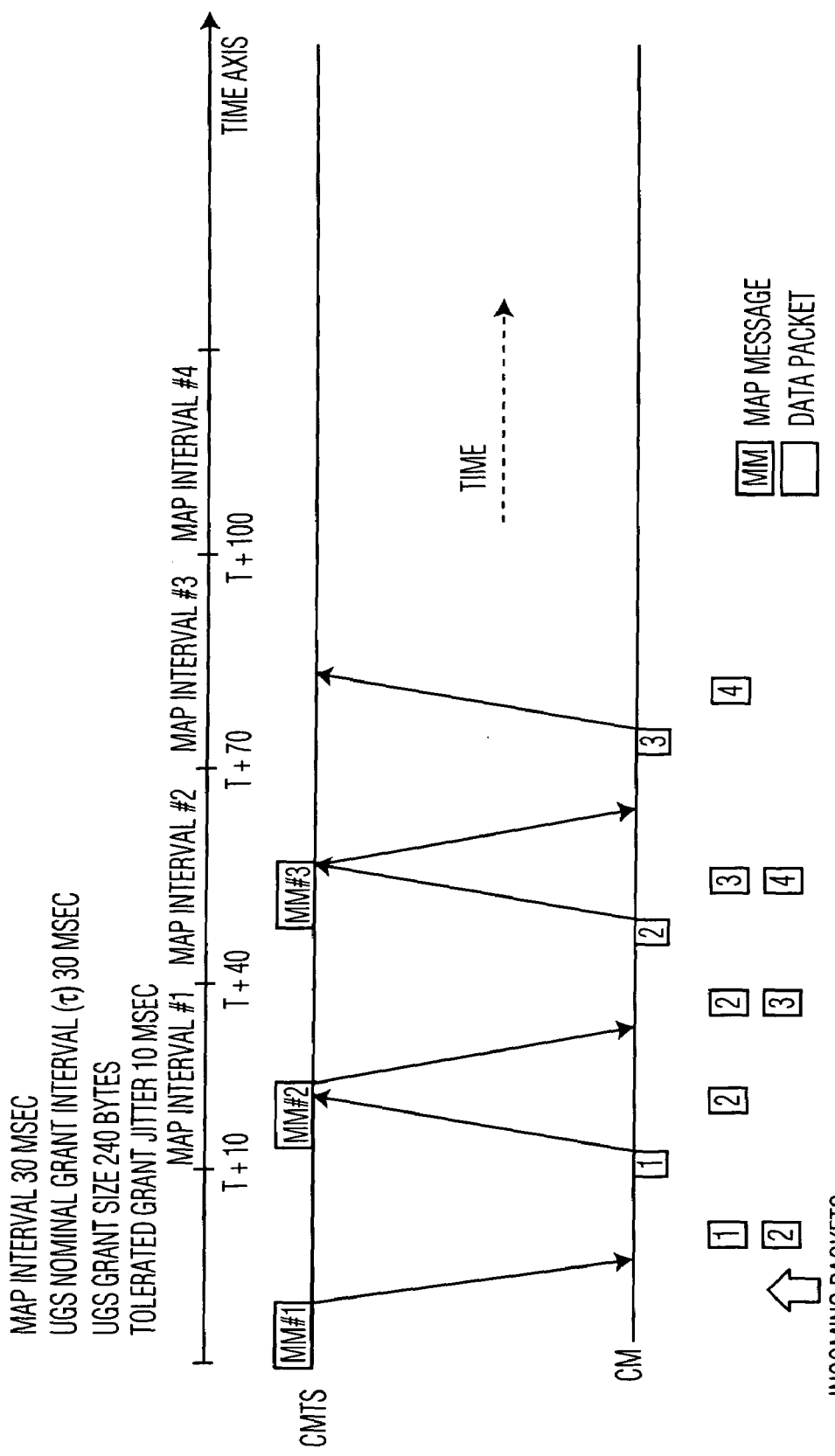
FIG. 4 is a timing diagram of an unsolicited grant service (UGS) of the network of FIG. 1.

FIG. 4 shows an exemplary timing diagram of the UGS scheduling service execution by the CM-CMTS pair, the arrows spanning the horizontal lines designated CM and CMTS representing upstream and downstream transmissions. The QoS parameters defined for this service class are the grant size to be allocated periodically (MM#), the nominal grant interval, designated "T," between successive grants, and the tolerated grant jitter. The CMTS allocates to the UGS service flow the data grant intervals of unsolicited Grant Size with a nominal grant interval between the successive grants. For example, a 64 Kbps pulse code modulated (PCM) voice (CBR) data stream can be transmitted using a UGS service flow with:

1) 10 msec nominal grant interval and 80 bytes grant size or
2) 20 msec nominal grant interval and 160 bytes grant size.

The tolerated grant jitter can be set to half the nominal grant interval in both cases.

In case of VBR video traffic, the bandwidth requirement for the UGS grant interval is usually not known at transmission time due to the VBR nature of video. As a result, a maximum bit-rate based CBR allocation peak stream of the bit stream severely underutilizes the network, whereas an average bitrate CBR allocation can result in inadequate networking delay and jitter and can also result in packet loss.

The intent of the DOCSIS real-time polling service class (rtPS) or "dynamically allocated grants" is to reserve upstream transmission opportunities for real-time traffic flows. These service flows receive periodic transmission opportunities regardless of network congestion, but these service flows release their transmission opportunities to other service flows when inactive. This service could support VBR data like video over the upstream channel. A service flow with rtPS scheduling class is allocated periodic request opportunities in which upstream bandwidth requests can be transmitted. Basically, the CM gets polled with request opportunities to find out about the instantaneous upstream bandwidth requirements for its data.

Figure 5:
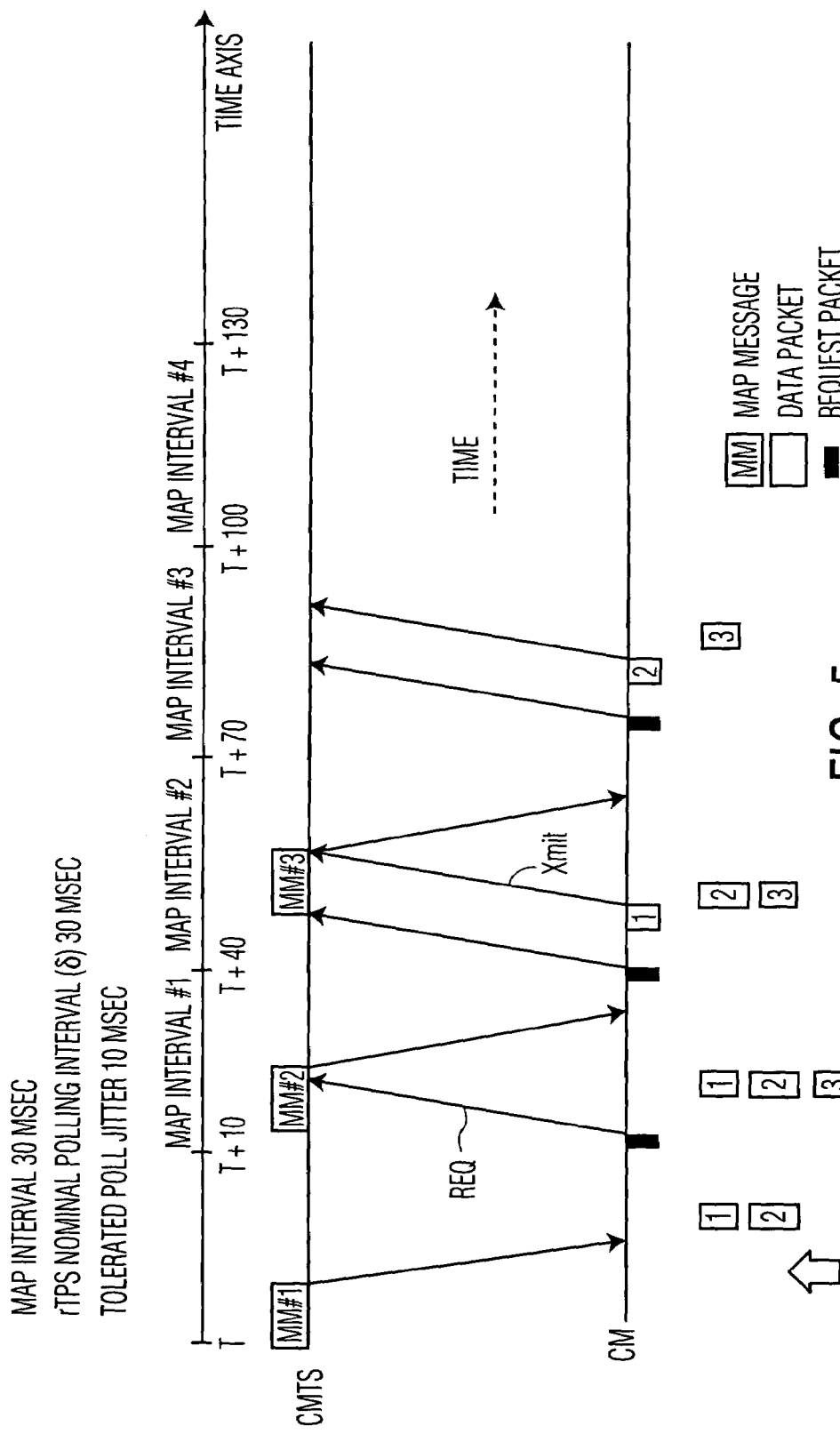
FIG. 5 is a timing diagram of a real time polling service (rtPS) of the network of FIG. 1.

An example timing diagram of the rtPS service scheduling by the CM-CMTS pair is shown in FIG. 5 the arrows spanning the horizontal lines designated CM and CMTS represent upstream and downstream transmissions respectively. Note that a CM transmits the first unit of data (packet #1) during the second map interval. The transmission of packet #1, designated by the arrow XMIT, must wait for the CMTS to allocate the upstream bandwidth based on previous request transmitted during the first map interval (time=T+10) designated by the arrow REQ.

The QoS parameters relevant to this class of service are the nominal-polling interval (δ) between successive request opportunities and the tolerated poll jitter. The CMTS allocates request intervals for an rtPS service flow with a nominal polling interval between successive request opportunities. The CM can use these request opportunities to request upstream bandwidth for the actual transmission of data. For example, a video stream with an average bit-rate of 6.4 Mbps can be transmitted in an rtPS service flow with request opportunities granted every 10 msec. In this case the CM will request data transmission opportunity for 8000 bytes on average.

This service flow inherently has high latency because each packet arriving at the CM will have to wait for the next request opportunity to transmit the bandwidth request and will have to wait for the data grant before being transmitted.

II. Unsolicited Grant Piggyback Request Service (UGPRS)

Figure 6:
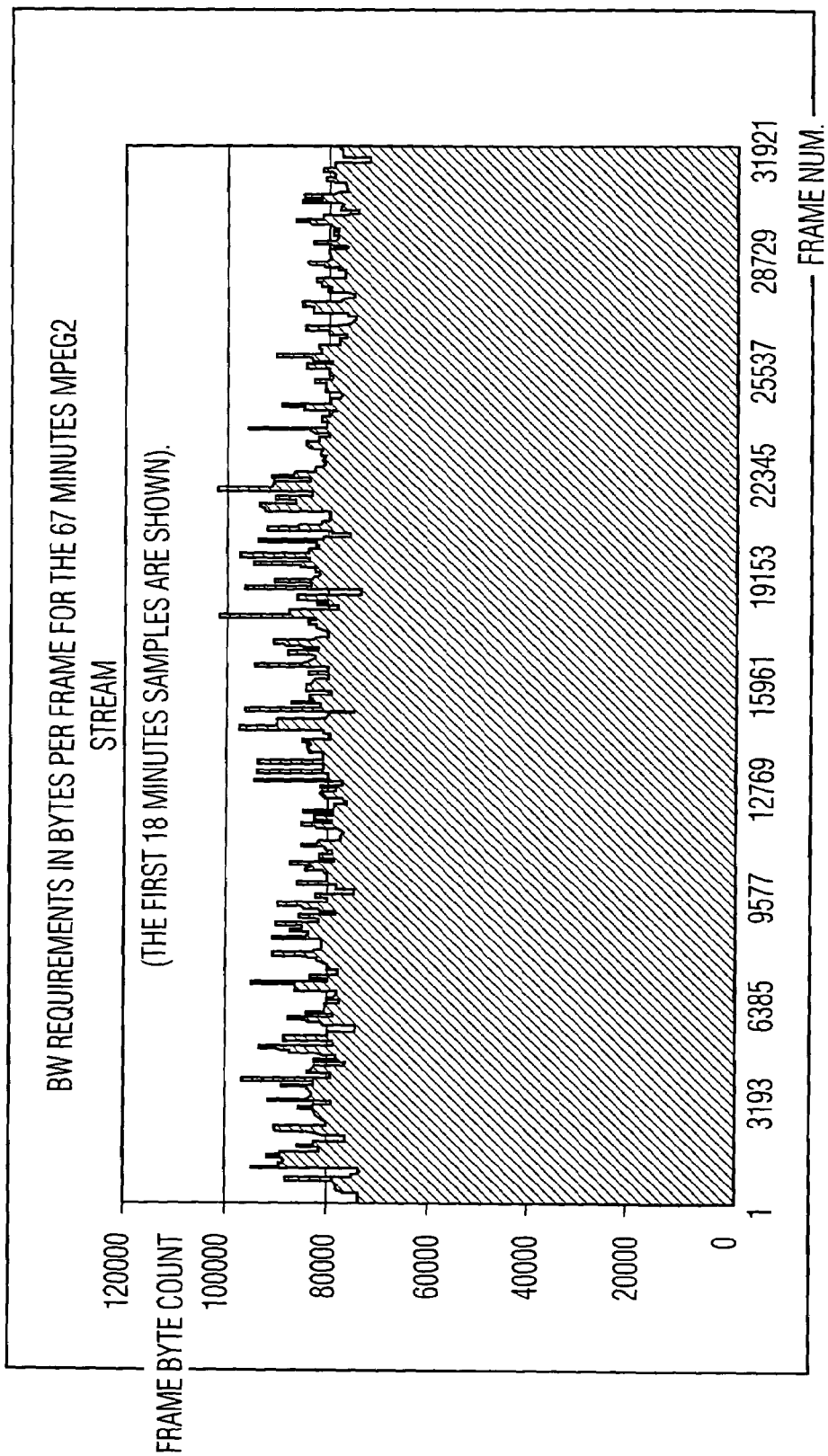
FIG. 6 is frame number vs. byte count graph of an MPEG encoded video signal.
Figure 6A:
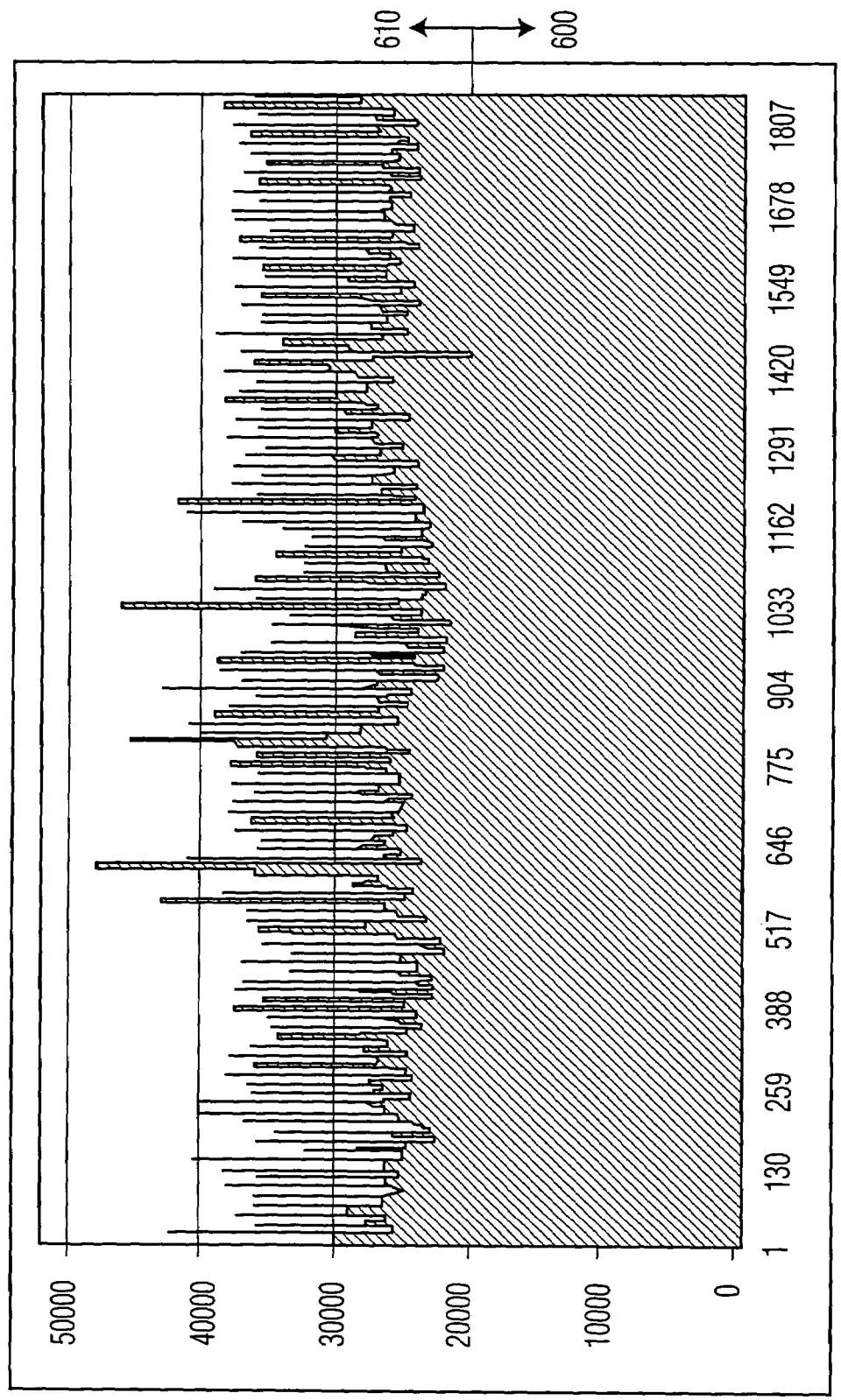
FIG. 6A is a magnified view of the frame number vs. byte count graph of the MPEG encoded video signal of FIG. 6.

A typical MPEG video sequence encoded by the hardware encoder utilizing VBV technique is shown in FIG. 6. A magnified view of the same video trace is shown in FIG. 6A. The overwhelming majority of digital video encodings thus can be characterized by: (1) a presence of a rather significant constant bitrate (DC) component 600, (2) an additional burst component 610; which accounts for the remaining variability in frame sizes, and which cannot be neglected.

Based on the decomposition of digital video into fixed rate (DC) and burst components, below the present invention provides a new DOCSIS MAC layer scheduling discipline (service class) intended to provide efficient QoS transport of compressed digital video.

As previously discussed, in general UGS scheduling provides low latency for real-time traffic. UGS service class is better suited to CBR traffic because upstream bandwidth is fixed and has to be reserved for a UGS service flow at call-setup time. In the case of VBR traffic, this results in a low utilization of the reserved bandwidth or in a sudden payload loss, as the fixed capacity channel is unable to keep up with the unexpected increase in the instantaneous bandwidth requirement. The rtPS scheduling provides better bandwidth utilization for VBR data but yields higher latency. In the case of rtPS, each data packet waits for a request opportunity in order for the CM to request upstream bandwidth and then waits until the CMTS responds to the upstream bandwidth request.

Naturally, it is desired that the new scheduling service provide a latency close to, if not lower than that of UGS, with channel utilizations typical of rtPS or better. To satisfy these desirable features of the new scheduling service, it is important to eliminate the lengthy delay associated with the CM waiting for request opportunities, issuing the requests for transmission to the CMTS and subsequent waiting by the CM for the data grants, as is currently done in rtPS. "Piggybacking", or simultaneously transmitting a grant request for the VBR portion of the video data along with the unsolicited data transmissions would eliminate the above delay and should increase channel utilization as well. The present invention provides a new scheduling service mechanism, unsolicited grant piggyback request service (UGPRS).

Figure 7:
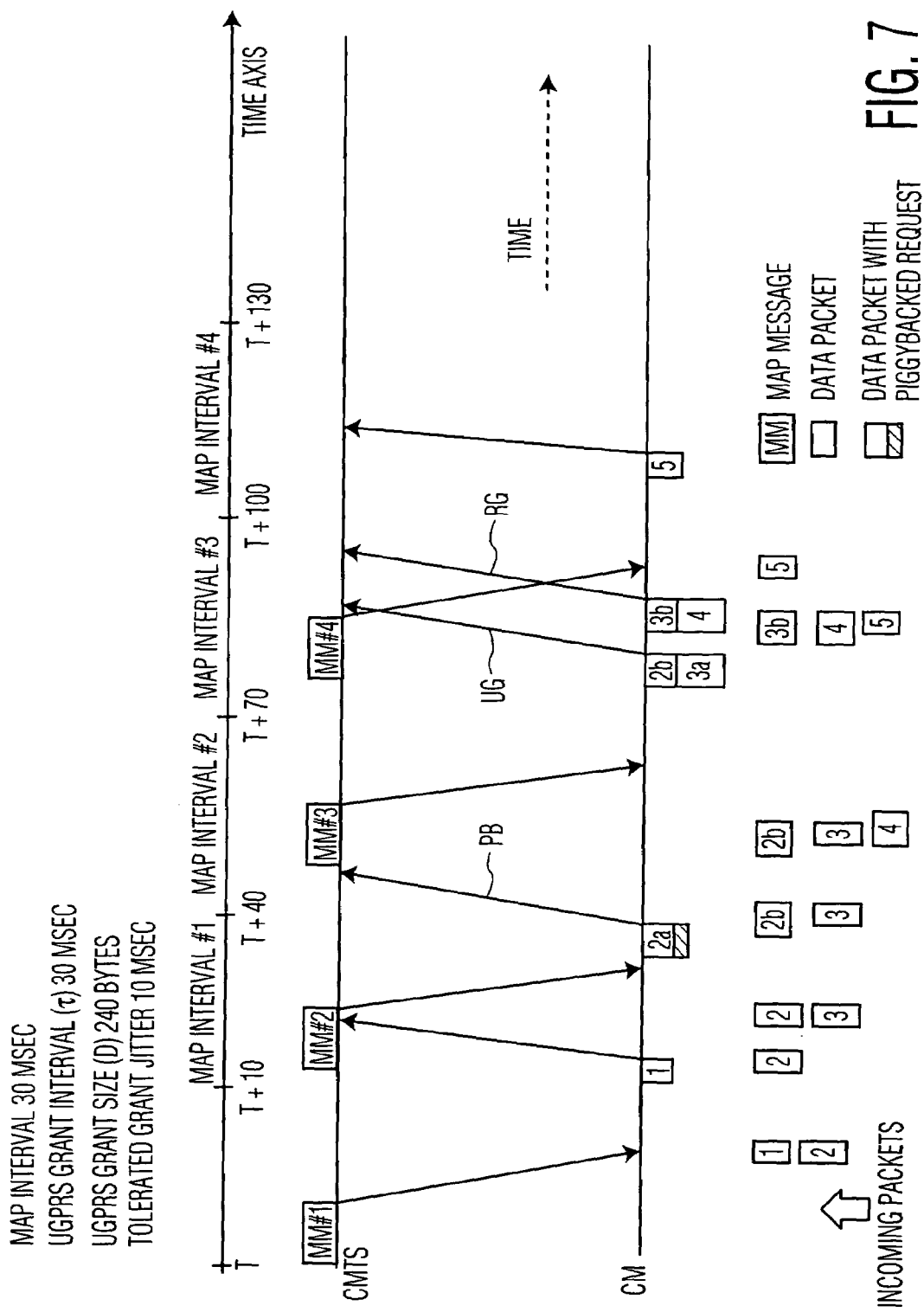
FIG. 7 is a timing diagram of a scheduling protocol in accordance with the present invention.

An example timing diagram of the UGPRS service execution by the CM-CMTS pair of the network 5 is shown in FIG. 7. The CMTS processes piggybacked requests and issues the corresponding data grants indicated by map messages. In the example shown in FIG. 7, the first data unit in the CM's queue (1) fits into the bandwidth size of the unsolicited grant. The second data unit's (2) bandwidth size is bigger than the unsolicited grant available, hence a part of the packet (2*a*) is transmitted along with a piggybacked request for the size of the remaining fraction (2*b*) designated by the arrow PB. In the next map message (i.e., MM#3) the CMTS allocates the unsolicited grant and an additional transmission opportunity in response to the piggybacked request. The fractions (2*b*) and (3*a*) are then transmitted in the unsolicited grant designated by the arrow UG, and fractions (3*b*) and (4) are transmitted in the requested grant designated by the arrow RG.

Thus, the proposed scheduling service reserves a certain fraction of the stream's average bit-rate requirement at the transmission or "call-setup" time. This reserved part is allocated to the service flow by the CMTS at periodic intervals ($\tau$) similar to those associated with UGS service. This part of the service is designated as unsolicited or "periodically" allocated grants.

Figure 8:
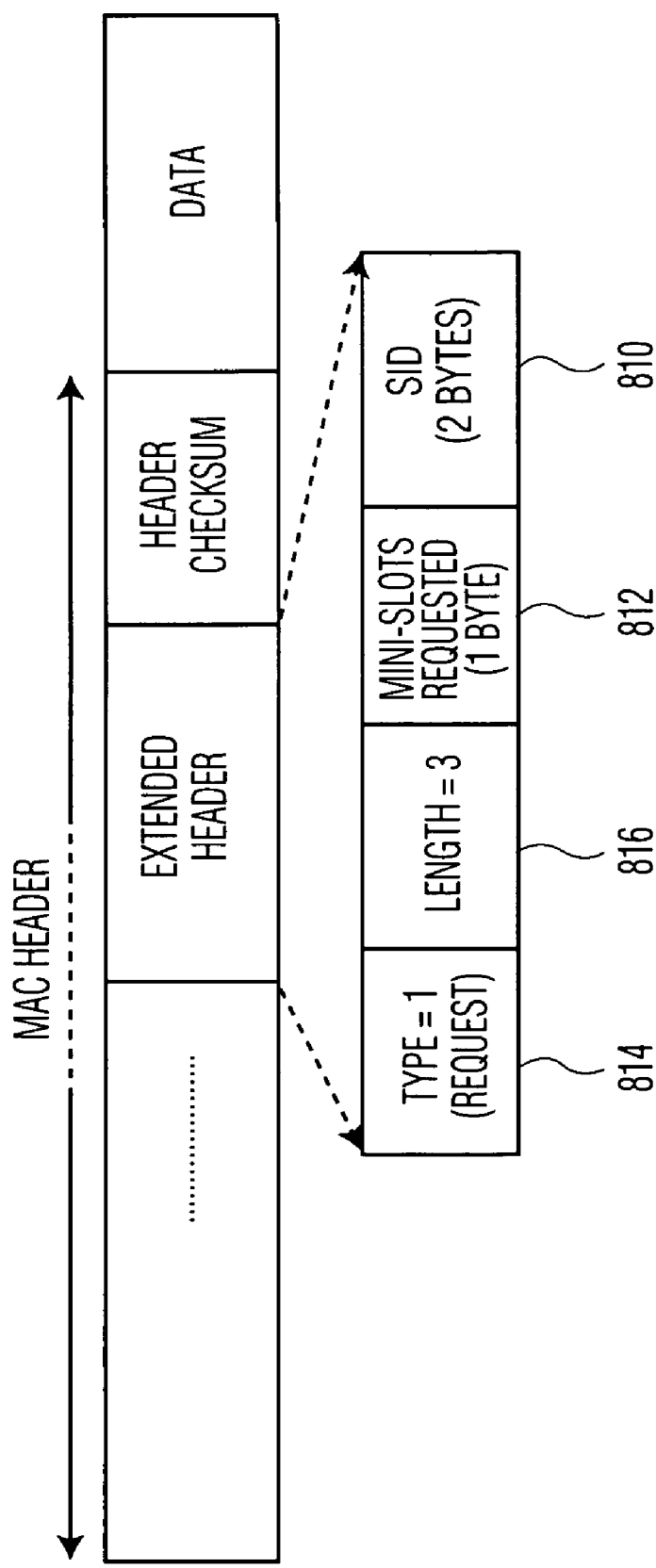
FIG. 8 is a data structure diagram of a media access control layer of an upstream signal in accordance with the present invention.

Upstream bandwidth requests for the remaining VBR portion of the data are then piggybacked to the data transmitted in the reserved bandwidth, using extended MAC header definition, as shown in FIG. 8. The extended header typically includes the service identification (SID) 810 of the CM, the requested bandwidth size of the dynamically allocated grant in bytes 812, the header flag 814 (set=1) and a length variable 816. Piggyback requests may also be provided in request, upstream privacy and upstream privacy with fragmentation extended header elements of the DOCSIS MAC layer. The present invention, however is applicable to any system employing fixed grant size packets having a header and an extended header wherein a dynamically allocated variable grant size can be requested.

The proposed QoS parameters associated with the UGPRS service scheduling class are: the unsolicited grant size (D) for the reserved upstream bandwidth, the nominal grant interval (t) between successive such grants, and tolerated grant jitter. The polling interval or tolerated poll jitter are not defined as part of the UGPRS parameter set because the requests are piggybacked instead of being sent in separate request transmission opportunities. The CMTS allocates data grants of unsolicited grant size with a nominal grant interval between two successive data grants. Whenever more upstream bandwidth is needed, the CM piggybacks a request in the data grant slot and the CMTS responds by allocating an appropriately sized upstream data transmission opportunity.

The value of the unsolicited allocation (D/t) of the UGPRS service determines the trade-off between the channel utilization and the transmission latency. A typical range for the unsolicited UGPRS allocation is [0.3–1.1] average bit-rate of the video stream.

Consider an example of transmitting a VBR MPEG stream with a 6.4 Mbps average bitrate, using the UGPRS. The following allocation of service could be used as an example:
  initial 3.2 Mbps using unsolicited grants, at a 20 msec nominal grant interval with an unsolicited grant size of 8000 bytes, and piggybacked requests for the remaining VBR portion of data.
  measurement-based provisioning of the unsolicited allocation.

It is evident that by reserving a bandwidth less than the average bit-rate over the unsolicited portion of the UGPRS, high utilization of the unsolicited portion of the channel can be assured. Elimination of request opportunities further improves channel utilization. Meanwhile, low latency can be guaranteed by using piggyback requests for the VBR portion of the stream instead of requesting bandwidth from the CMTS during the nominal polling intervals. The method of determining the size of the unsolicited allocation is described below. Thus, the absence of polling results in a higher channel utilizations than that of the rtPS and significantly higher than that of the UGS.

III. Measurement-Based Dynamic UGPRS Unsolicited Channel Allocation

UGPRS provides high channel utilizations (>0.95) when the unsolicited allocation is kept within [0.3–1.1] times the average bit-rate range. Greater unsolicited allocations lower the UGPRS utilization with the added benefit of decreasing the video frame latency. The question remains: for a given video stream, what should the unsolicited UGPRS allocation be in order to provide high channel utilization and acceptable latency. The present invention provides a simple scheme, which dynamically adjusts the unsolicited allocation based on periodic measurements of the two variables: (1) unsolicited channel allocation and (2) additional amount of traffic granted by the CMTS in response to the piggybacked requests from the CM. These measurements can be performed by the CMTS for each active UGPRS session. Alternatively, to provide for better CMTS scalability, each CM can perform these measurements and notify the CMTS about the new unsolicited allocation (i.e., new value of D) using the unsolicited grant synchronization header element (UGSH) in the extended header.

Figure 9:
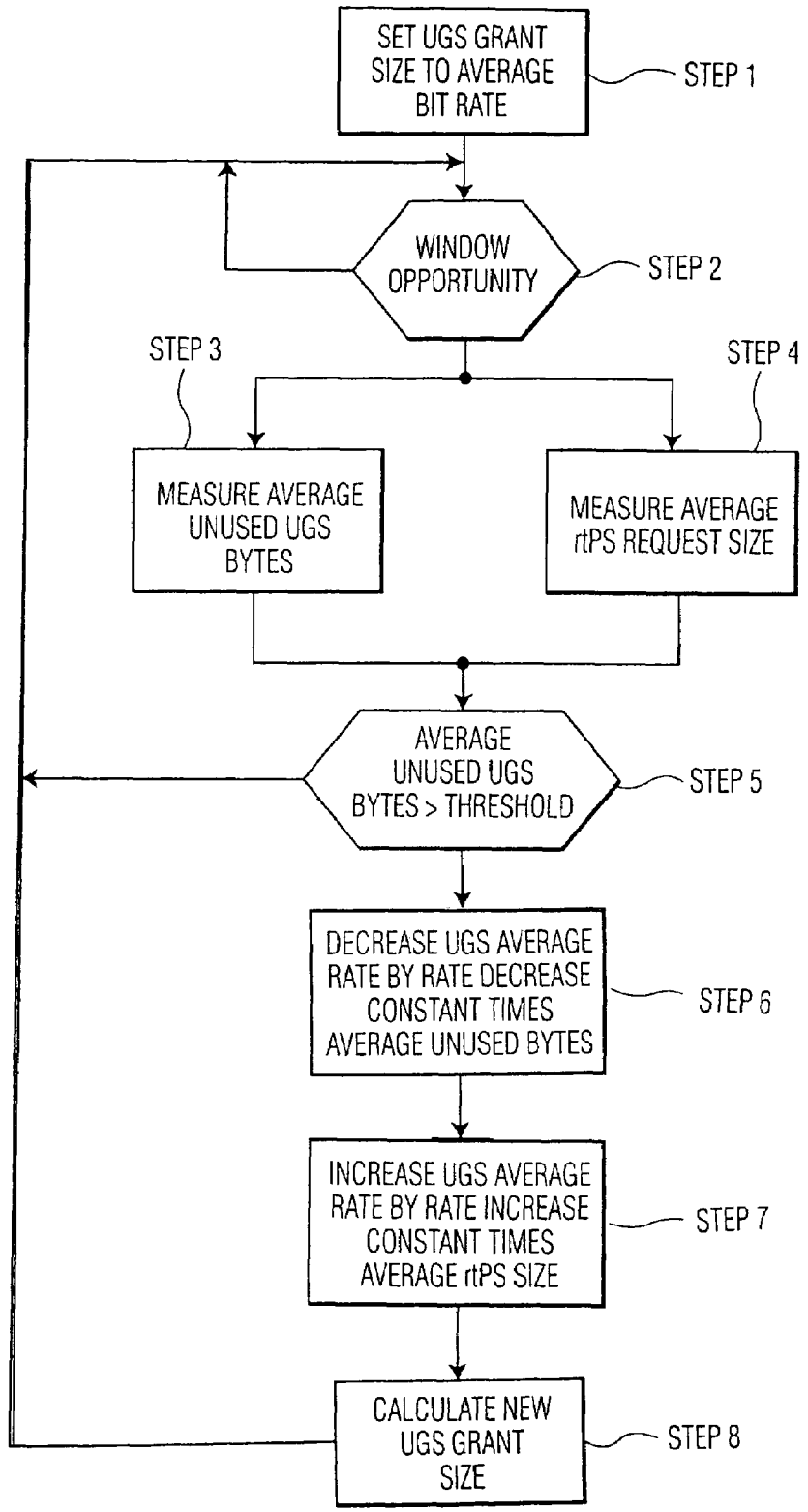
FIG. 9 is a flow diagram of a method of dynamically adjusting the unsolicited grant service (UGS) in accordance with a preferred embodiment of the invention.

The proposed method is illustrated in the flow chart of FIG. 9 as follows: The initial unsolicited allocation is set at average bit rate in step 1. Then it is determined if a window time opportunity=(N times the map Intervals (e.g., N=5)) is present in step 2. If so, in step 3, the average number of unused bytes in the unsolicited portion or the UGPRS is measured. At the same time in step 4, the average number of bytes transmitted over the rtPS or "piggyback" requests is determined. In step 5 the average number of unused UGS bytes is compared to a predetermined threshold. If the average number of unused UGS bytes is greater than the threshold then, for the next window, the number of bytes times the rate decrease constant (chosen between 0 and 1) is subtracted from the unsolicited allocation In step 6. At the same time, the average number of bytes transmitted over the piggyback request channel portion times the rate increase constant is added to the unsolicited allocation in step 7. Thus, in step 8, the two constants (increase and decrease) control how fast the unsolicited allocation tracks the changes in the dynamic bandwidth requirements of a video stream. The inventors have determined the rate decrease constant of 0.5 and the rate increase constant of 1.0 provide for an acceptable "dynamic" UGPRS performance.

It will be appreciated by those skilled in the art that changes could be made to the embodiments described above without departing from the broad inventive concept thereof. For example, the proposed QoS scheduling service class while disclosed for use with a DOCSIS compliant network, should be applicable to VBR video transport in similar traffic environments. It is underestood, therefore, that this invention is not limited to the particular embodiments disclosed, but is intended to cover modifications within the spirit and scope of the present invention.

What is claimed:

1. A method of transmitting variable bit rate data packets over a bi-directional contention and reservation based network, the network including an operably linked system controller for receiving upstream channel packets and originating downstream channel packets, at least one operably linked remote terminal for receiving the downstream channel packets and originating the upstream channel packets, the network providing periodically allocated grants from the system controller to the at least one remote terminal in the downstream channel for scheduling data packet transfers in the upstream channel, the periodically allocated grants having a bandwidth size, and the network providing dynamically allocated grants from the system controller to the at least one remote terminal in the downstream channel upon request of the at least one remote terminal for scheduling data packet transfers in the upstream channel, the dynamically allocated grants being of a requested bandwidth size, the method comprising:

decomposing a first variable bit-rate data packet of a stream of data packets to be transmitted from the at least one remote terminal through the upstream channel into a constant bit-rate packet portion and a variable bit-rate packet portion, the constant bit-rate packet portion having a bandwidth size substantially equal to the average bit-rate of the stream of packets;

determining whether the bandwidth size of the decomposed packet is greater than the size of the periodically allocated grant, and, if so;

requesting a dynamically allocated grant, the requested dynamically allocated grant substantially equal in bandwidth size to the variable bit-rate packet portion;

transmitting the constant bit-rate packet portion in response to a periodically allocated grant; and transmitting the variable bit-rate packet portion in response to a next available grant.

2. The method of claim 1 wherein the bandwidth size of a data packet of a stream of packets is determined by storing the data packet in a buffer of the at least one remote terminal and the bandwidth size of the stored data packet is determined by comparing the bandwidth size of the buffer contents to at least one bandwidth size threshold value.

3. The method of claim 1 wherein the variable bit-rate packet portion is transmitted in response to the dynamically allocated grant corresponding to the request.

4. The method of claim 1 wherein the variable bit rate packet data is compressed video data.

5. The method of claim 4 wherein the video is compressed pursuant to the motion picture experts group standard (MPEG).

6. The method of claim 1 wherein the network is data over cable system interface (DOCSIS) compliant.

7. The method of claim 1 wherein the request resides in the extended header of the constant bit-rate packet.

8. A method of dynamically adjusting the size of a periodically allocated grant of a bi-directional contention and reservation based cable network, the method comprising:

determining an average bandwidth size of an unused portion of the periodically allocated grant;

determining an average bandwidth size of requested dynamically allocated grants; and adjusting the bandwidth size of the periodically allocated grant based on the measured sizes and at least one predetermined threshold.

9. The method of claim 8, further comprising:

transmitting a first portion of a data packet in a stream of data packets from at least one remote terminal through an upstream channel in response to the periodically allocated grant;

determining whether a combined bandwidth size of a remaining portion of the data packet and a subsequent data packet of a stream of data packets to be transmitted from the at least one remote terminal through the upstream channel is greater than the size of the next available periodically allocated grant, and, if so;

transmitting at least the remaining portion of the data packet in response to the next available periodically allocated grant;

requesting a further dynamically allocated grant along with the transmission of the at least remaining portion, the requested dynamically allocated grant being of a bandwidth size by which the remaining portion of the data packet and the subsequent data packet exceed the size of the next available periodically allocated grant; and transmitting at least a remaining portion of the subsequent data packet in response to an available grant following the next available grant.

10. The method of claim 9 wherein the remaining portion of the subsequent data packet is transmitted in response to the dynamically allocated grant corresponding to the request.

11. The method of claim 9 wherein the stream of packet data is variable-bit rate compressed video data.

12. The method of claim 11 wherein the video is compressed pursuant to the motion picture experts group standard (MPEG).

13. The method of claim 9 wherein the request resides in an extended header of the first portion transmission.

14. The method of claim 8 further comprising the step of transmitting a first portion of a data packet in a stream of data packets from at least one remote terminal through an upstream channel in response to the periodically allocated grant;

wherein the bandwidth size of a data packet of a stream of packets is determined by storing the data packet in a buffer of the at least one remote terminal and the bandwidth size of the stored data packet is determined by comparing the bandwidth size of the buffer contents to the at least one predetermined.

15. The method of claim 8 further comprising the step of transmitting a first portion of a data packet in a stream of data packets from at least one remote terminal through an upstream channel in response to the periodically allocated grant;

wherein the first portion has a bandwidth size that is less than or equal to about the bandwidth size of the periodically allocated grant.

16. The method of claim 8 wherein the network is data over cable system interface (DOCSIS) compliant.

\* \* \* \* \*